(12) United States Patent
Yan (10) Patent No.: US 7,499,256 B1
(45) Date of Patent: Mar. 3, 2009

(54) ELECTRICITY-CONDUCTING ROLLER STRUCTURE

(76) Inventor: Li-Lan Yan, No. 36-1, Siaokang Lang, Puzih City, Chiayi County (TW)

( * ) Notice: Subject to any disclaimer, the term of this patent is extended or adjusted under 35 U.S.C. 154(b) by 0 days.

(21) Appl. No.: 11/976,479

(22) Filed: Oct. 25, 2007

(51) Int. Cl.
*H05F 3/00* (2006.01)
(52) U.S. Cl. ...................................... 361/212; 361/221
(58) Field of Classification Search ................ 361/212, 361/216, 221; 16/44; 188/1.12
See application file for complete search history.

(56) References Cited

U.S. PATENT DOCUMENTS 2,686,891 A * 8/1954 Burgin ........................ 361/219

2007/0044273 A1 * 3/2007 Milbredt ......................... 16/45

* cited by examiner

*Primary Examiner*—Danny Nguyen
(74) *Attorney, Agent, or Firm*—Rosenberg, Klein & Lee (57) ABSTRACT

An electricity-conducting roller includes a hub joined to a lower end of a frame of a vehicle, and an electricity-conducting roller module; a wheel of the vehicle is fitted on the hub, and the electricity-conducting roller module is fitted to a bottom of the hub, and comprises a fixed supporting member secured to the bottom of the hub, an electricity-conducting roller, a swinging support member pivoted on the fixed support member for holding the electricity-conducting roller in position, and an elastic element to bias the swinging support member downwards in order for the electricity-conducting roller to be in constant touch with the floor; the swinging support member will swing up and down while the vehicle is moving on an uneven floor, thus preventing the electricity-conducting roller from being obstructed by bumps and holes on the uneven floor.

13 Claims, 7 Drawing Sheets

ELECTRICITY-CONDUCTING ROLLER STRUCTURE

BACKGROUND OF THE INVENTION

1. Field of the Invention

The present invention relates to an improvement on an electricity-conducting roller structure, more particularly one, whose electricity-conducting roller is supported on a swinging support member; the swinging support member is biased downwards with an elastic element, and can pivot up and down so as to prevent bumps and holes on an uneven floor form obstructing the electricity-conducting roller.

2. Brief Description of the Prior Art

Patients are usually transported from a sick chamber with vehicles, e.g. wheelchairs and wheeled hospital beds, to the examination division to have a medical examination such as computerized axial tomography (CAT) scan and nuclear magnetic resonance radiography. However, when such vehicles are moving, static electricity will be produced thereon owing to the vehicles rubbing against other objects, especially in cold, dry, and low-humidity seasons, which static electricity will cause shock and discomfort to the patients on the vehicles. If a patient has a medical examination with a high-precision medical examination apparatus while resting on the vehicle, static electricity will interfere with the medical examination apparatus. Consequently, errors are prone to happen to the outcome of the examination.

Figure 7:
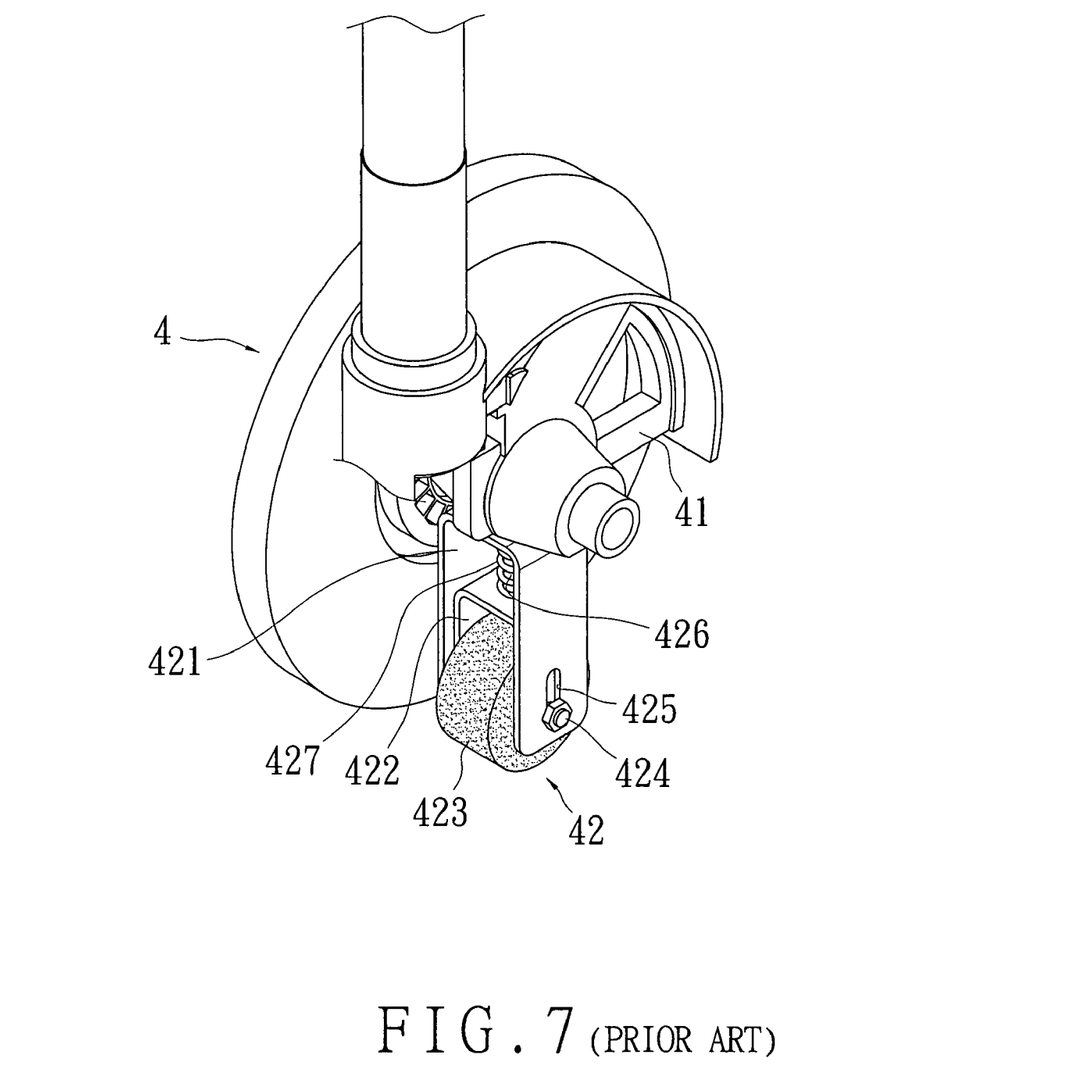
FIG. 7 is a perspective view of the prior art.

To overcome the above problems, referring to FIG. 7, the inventor of the present invention developed a kind of electricity-conducting roller module 42 before. The electricity-conducting roller module 42 is joined to a lower end of a metallic hub 41 of a wheel 4 of a vehicle, and includes first and second holding members 421 and 422, and an electricity-conducting roller 423, which is supported on the second holding member 422 with an axle 424 thereof being passed two sides of the second holding member 422. The second holding member 422 is held in the first holding member 421. The second holding member 421 has two opposing slots 425, and the axle 424 of the roller 423 is passed the slots 425 at two ends thereof. A rod part 426 is positioned between upper portions of the both the first and the second holding members 421 and 422, and an elastic element 427 is positioned around the rod part 426 to bias the second holding member 422 downwards. Therefore, it is certain that the electricity-conducting roller 423 will be constantly in contact with the floor in order for allowing static electricity carried on the vehicle to travel onto the floor through the electricity-conducting roller module 42.

Furthermore, when the vehicle is moving on an uneven floor/road, the electricity-conducting roller 423 will move up and down with the axle 424 moving within the slots 425 of the first holding member 421; thus, small holes and bumps of the uneven floor can't obstruct the roller 423. And, the elastic element 426 will help to reduce the shock produced from the roller 423 hitting against the holes and bumps on the uneven floor/road.

However, because the electricity-conducting roller 423 can only move up and down, it is prone to be obstructed by large holes and bumps on an uneven floor/road. Consequently, the vehicle can't move smoothly on an uneven floor with large holes and bumps.

SUMMARY OF THE INVENTION

It is a main object of the present invention to provide an improvement on an electricity-conducting roller structure to overcome the above problems.

An electricity-conducting roller according to an embodiment of the present invention includes a hub joined to a lower end of a frame of a vehicle, and an electricity-conducting roller module, which is fitted to a bottom of the hub, and comprises a fixed supporting member, an electricity-conducting roller, an elastic element, and a swinging support member for the roller. The fixed supporting member is secured to the bottom of the hub. The swinging support member is pivoted on the fixed support member at one end. The electricity-conducting roller is held in position by means of the swinging support member. The elastic element biases the swinging support member downwards in order for the electricity-conducting roller to be in constant touch with the floor. The swinging support member will swing up and down when the vehicle is moving on an uneven floor, thus preventing the roller from being obstructed by bumps and holes on the uneven floor.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
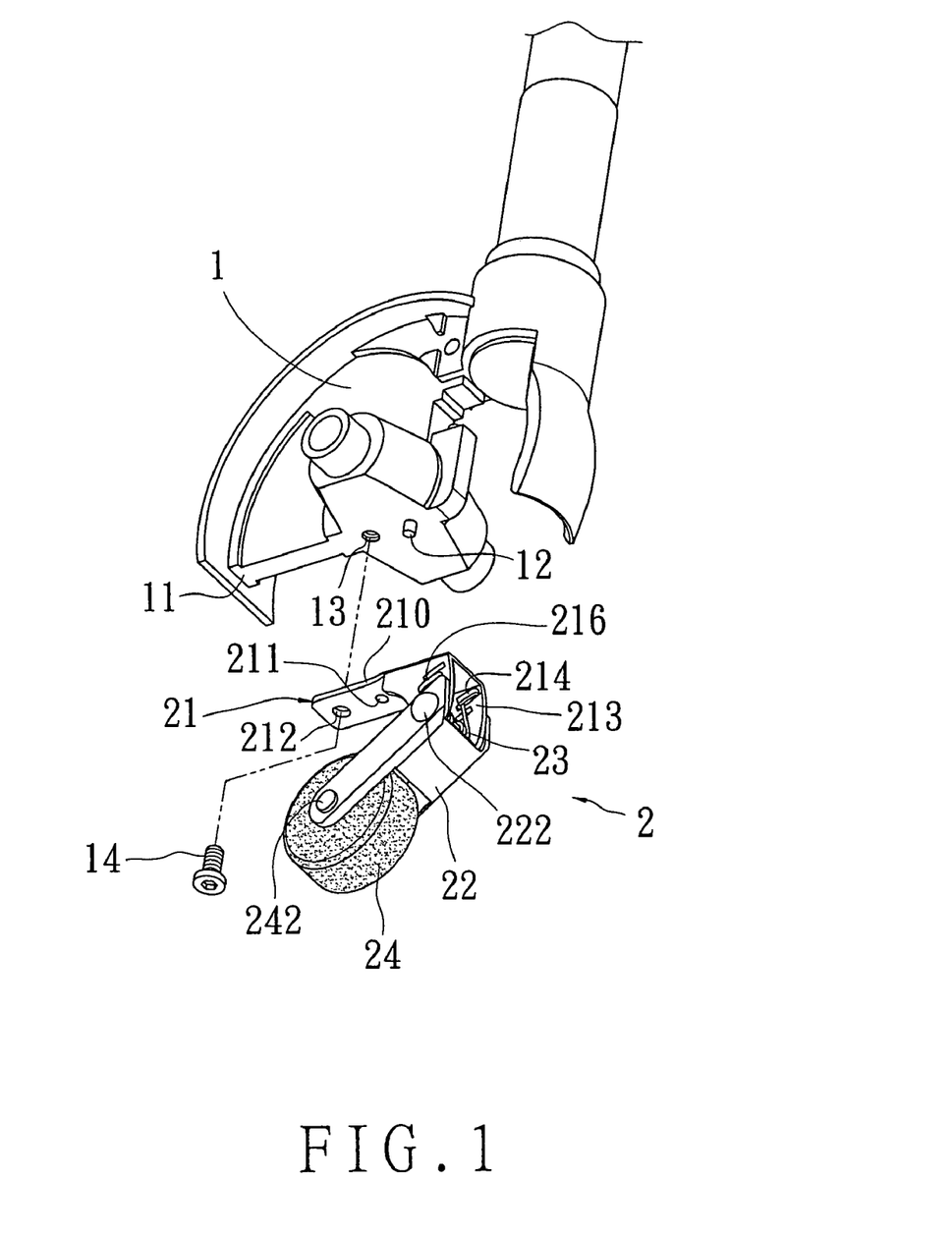
FIG. 1 is an exploded perspective view of the present invention.
Figure 2:
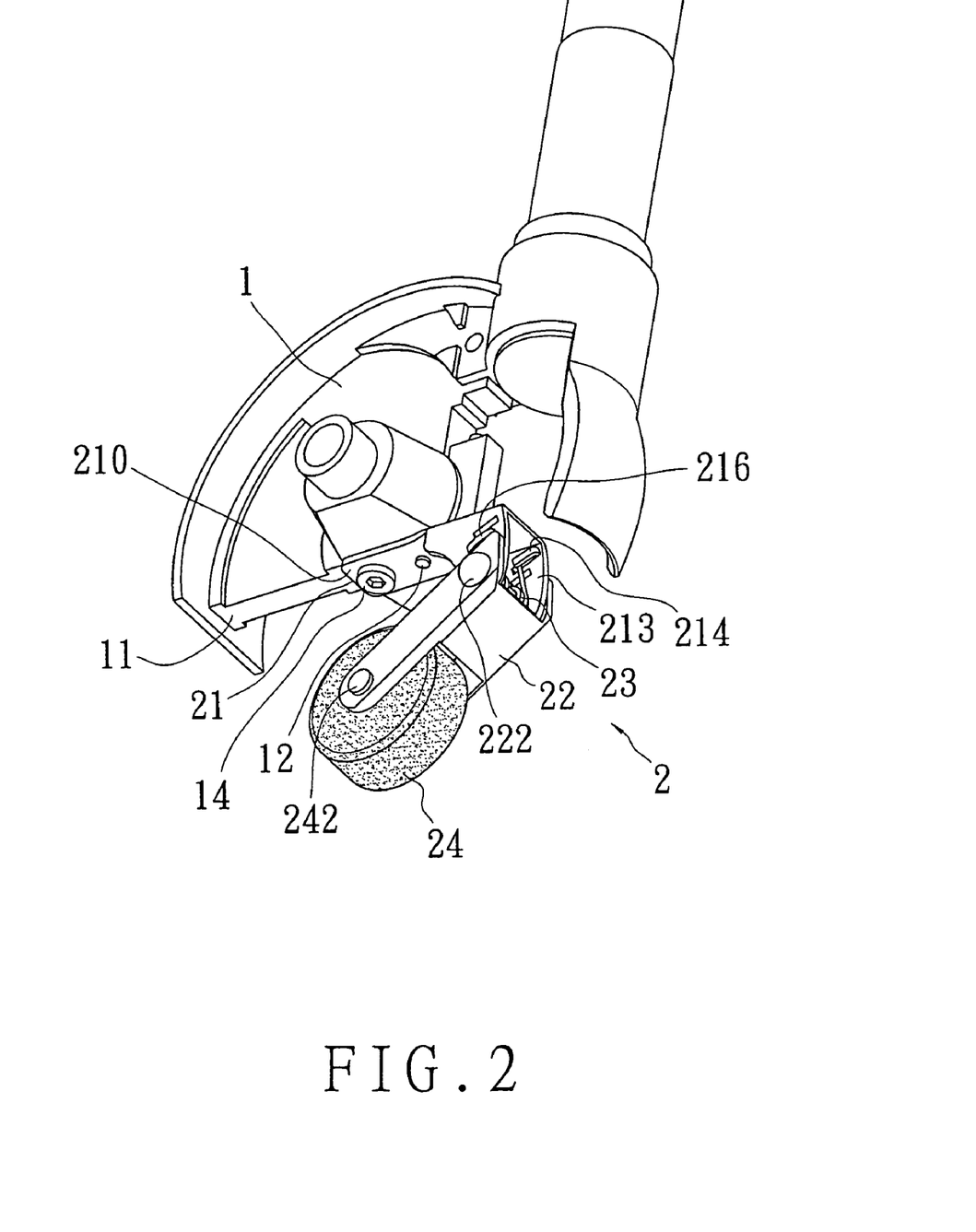
FIG. 2 is a perspective view of the present invention (1)

Referring to FIGS. 1 and 2, a preferred embodiment of an electricity-conducting roller of the present invention includes a metallic hub 1, and an electricity-conducting roller module 2 fitted to a bottom of the hub 1.

The metallic hub 1 is joined to a lower end of a frame of a vehicle such as a wheelchair and a hospital bed. And, a wheel 10 is fitted on the hub 1. The bottom of the metallic hub 1 has a flat side 11, and has a locating post 12 and a fixing hole 13 thereon.

Figure 3:
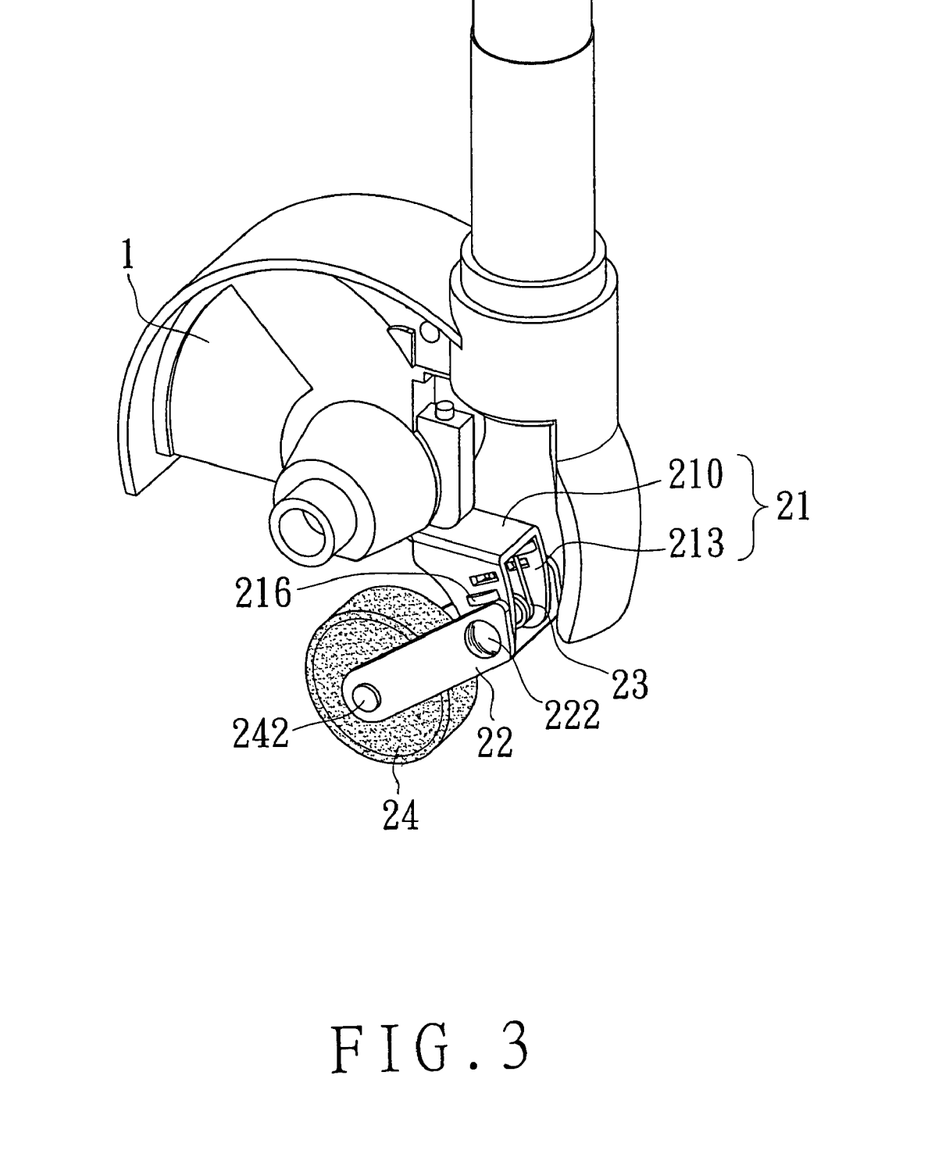
FIG. 3 is a perspective view of the present invention (2)
Figure 4:
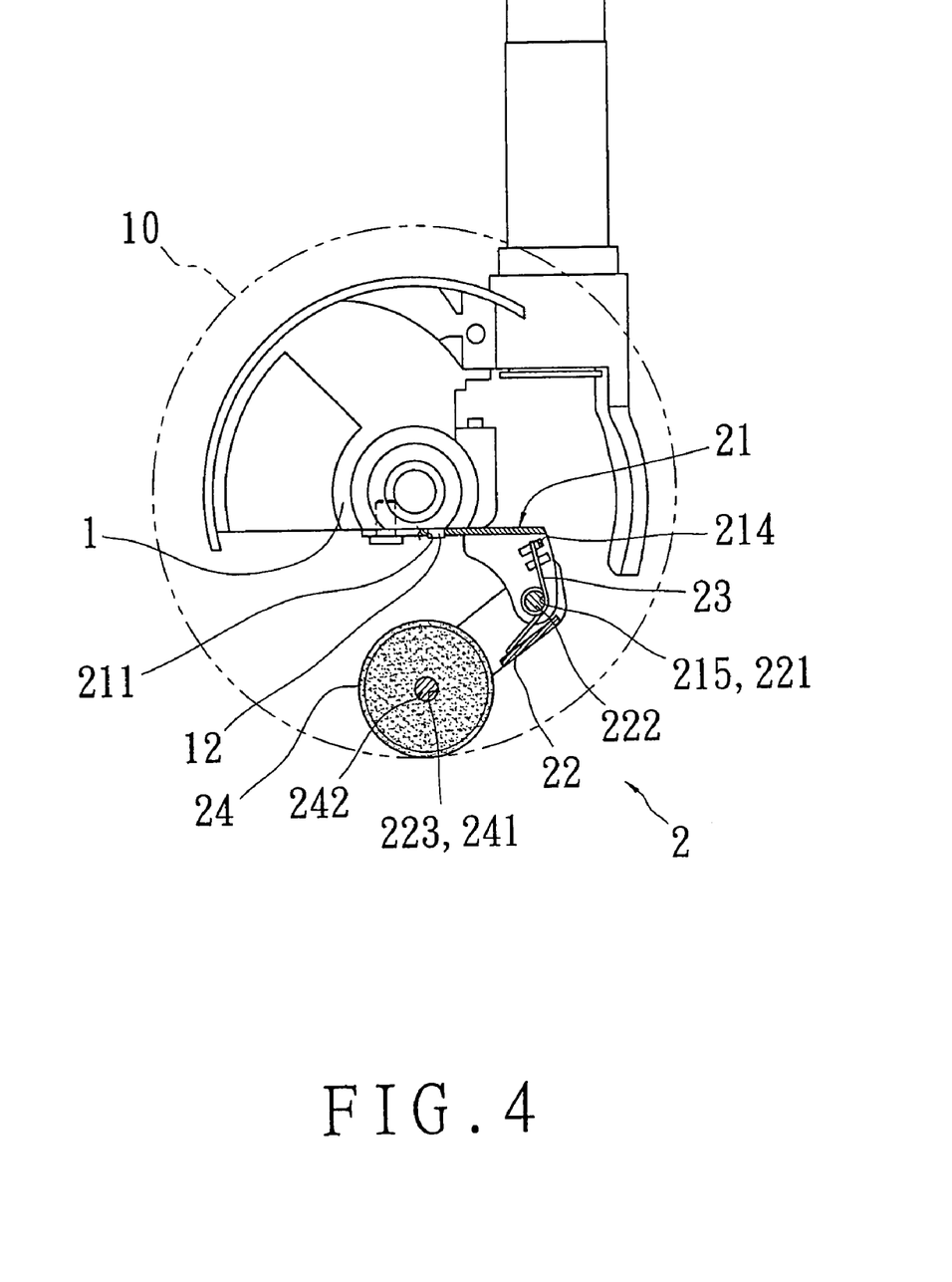
FIG. 4 is a sectional view of the present invention.

The electricity-conducting roller module 2 includes:

a fixed supporting member 21 made of metallic materials, the fixed supporting member 21 includes a connecting portion 210 securely joined to the bottom of the hub 1, and a pivotal portion 213 adjoining the connecting portion 210, as shown in FIGS. 3 and 4; the connecting portion 210 has a fixing hole 212, and a holding hole 211 thereon; the fixed supporting member 21 is securely joined to the hub 1, with the locating post 12 of the hub 1 being held in the holding hole 211 of the connecting portion 210, by means of a fixing piece 14, which is passed through the fixing hole 13 of the hub 1 as well as the fixing hole 212 of the connecting portion 210, and which is a screw; the pivotal portion 213 has a fastening protrusion 214 on an inner side thereof, and a pivotal hole 215 thereon; the pivotal portion 213 of the fixed supporting member 21 has a curbing protrusion 216 on an outer side thereof;

a swinging support member 22 pivoting on the fixed support member 21; the swinging support member 22 has a pivotal hole 221 thereon, and is pivoted to the pivotal portion 213 of the fixed supporting member 21 by means of a pivotal shaft 222, which is passed through both the pivotal holes 215 and 221; the swinging support member 22 has a through hole 223 on a lower end thereof;

an elastic element 23, which is positioned around the pivotal shaft 222 to bias the swinging support member 22 downwards, and which is a torsion spring; the elastic element 23 has first and second terminal portions at two ends thereof; the first terminal portion of the elastic element 23 is fastened to the fastening protrusion 214 of the fixed supporting member 21; the second terminal portion of the elastic element 23 is pressed against the swinging support member 22; and an electricity-conducting roller 24 fitted to the swinging support member 22, the electricity-conducting roller 24 is made of plastic materials mixed with metallic pellets, and has a through hole 241; the electricity-conducting roller 24 is joined to the swinging support member 22 by means of an axle rod 242 passed through the through hole 241 as well as the through hole 223 of the swinging support member 22.

Referring to FIG. 4, when the vehicle is being moved on the wheel 10, the metallic electricity-conducting roller module 2 will continue touching the floor in order for static electricity to travel from the vehicle to the floor through it, thus preventing the person resting on the vehicle from being subjected to the static electricity, which is produced owing to the vehicle rubbing against other objects, and will cause shock and discomfort. Consequently, when the person is having a medical examination with a medical examination apparatus while resting on the vehicle, there won't be static electricity from the vehicle to interfere with the medical examination apparatus to cause errors to the outcome of the medical examination.

Figure 5:
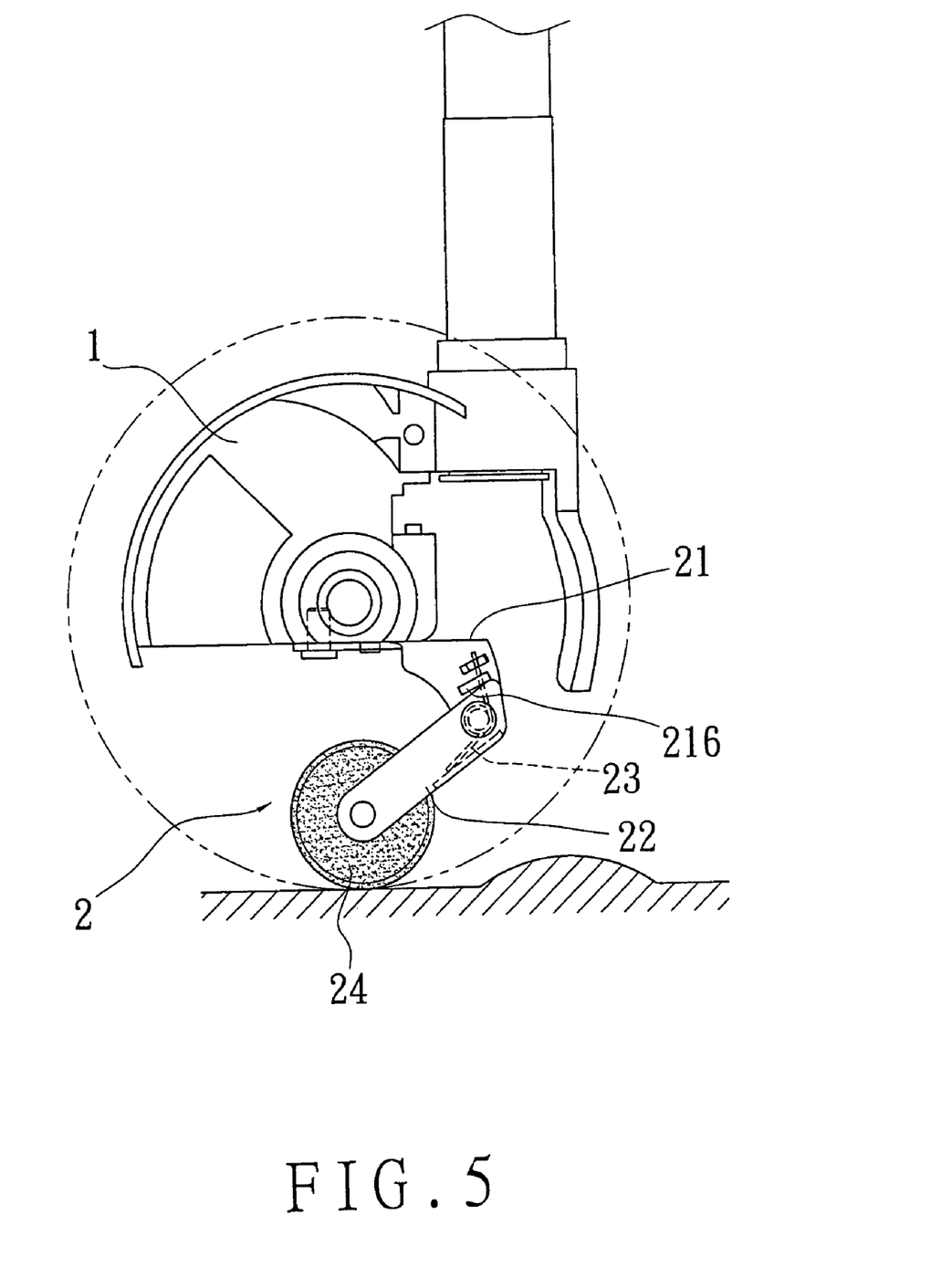
FIG. 5 is a view of the electricity-conducting wheel of the present invention, taken when the wheel is in use (1)
Figure 6:
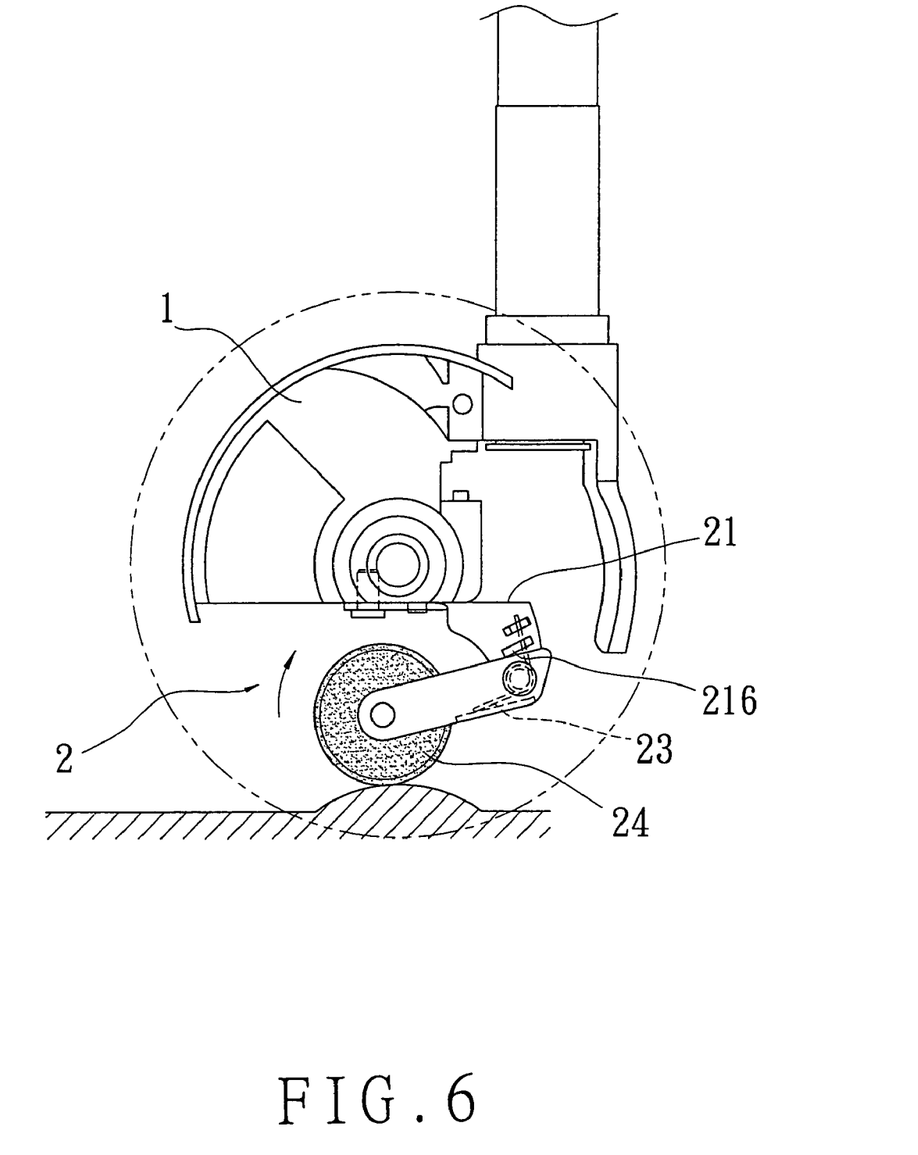
FIG. 6 is a view of the electricity-conducting wheel of the present invention, taken when the wheel is in use (2)

Furthermore, referring to FIGS. 5 and 6, when the electricity-conducting roller module 2 hits against a bump on a bumpy ground/road, the swinging support member 22 will be forced to pivot on the fixed supporting member 21, thus allowing the electricity-conducting roller 24 to move across the bump smoothly; at the same time, the elastic element 23 will reduce the shock against the electricity-conducting roller 24, and the electricity-conducting roller 24 will be forced to get back into contact with the ground/road by means of the elastic element 23 immediately after the swinging support member 22 stops swinging; the uneven ground/road can't obstruct the electricity-conducting roller 24, and the vehicle still can move along smoothly the uneven ground/road. In addition, the curbing protrusion 216 formed on the outer side of the fixed supporting member 21 will restrain the swinging support member 22 from swinging over too large a range; thus, the electricity-conducting roller 24 is prevented from hitting against the fixed supporting member 21 to get damaged.

From the above description, it can be seen that the present invention has the following advantages:

1. The electricity-conducting roller can move smoothly on an uneven floor without the possibility of being obstructed by bumps and holes on the uneven floor because it is fitted on the swinging support member capable of pivoting up and down over a relatively large range.

2. A curbing protrusion is formed on the outer side of the fixed supporting member to restrain the swinging support member from swinging over too large a range. Therefore, the electricity-conducting roller is prevented from hitting against the fixed supporting member to get damaged.

3. The elastic element can help the swinging support member of the electricity-conducting roller to swing more smoothly, and can make the electricity-conducting roller get back into contact with an uneven floor immediately after the swinging support member stops swinging, thus allowing static electricity to travel from the vehicle to the floor.

What is claimed is:

1. An improvement on an electricity-conducting roller structure, comprising
   a hub joined to a lower end of a frame of a vehicle; and
   an electricity-conducting roller module fitted to a bottom of the hub; the electricity-conducting roller module including:
   (a) a fixed supporting member, the fixed supporting member including a connecting portion securely joined to the bottom of the hub;
   the fixed supporting member including a pivotal portion adjoining the connecting portion; the pivotal portion having a fastening protrusion on an inner side thereof; the pivotal portion having a pivotal hole thereon;
   (b) a swinging support member pivoting on the fixed support member; the swinging support member having a pivotal hole thereon; the swinging support member being pivoted to the pivotal portion of the fixed supporting member by means of a pivotal shaft passed through both the pivotal holes; the swinging support member having a through hole on a lower end thereof;
   (c) an elastic element positioned around the pivotal shaft to bias the swinging support member downwards; the elastic element having first and second terminal portions at two ends thereof; the first terminal portion being fastened to the fastening protrusion of the fixed supporting member; the second terminal portion of the elastic element being pressed against the swinging support member; and
   (d) an electricity-conducting roller, the electricity-conducting roller having a through hole; the electricity-conducting roller being joined to the swinging support member by means of an axle rod passed through the through hole thereof as well as the through hole of the swinging support member.

2. The improvement on an electricity-conducting roller structure as claimed in claim 1, wherein:
   the bottom of the hub has a flat side, and has a locating post as well as a fixing hole thereon; and
   the connecting portion of the fixed supporting member has a fixing hole, and a holding hole thereon; the fixed supporting member being securely joined to the hub, with the locating post of the hub being held in the holding hole of the connecting portion, by means of a fixing piece passed through the fixing hole of the hub as well as the fixing hole of the connecting portion.

3. The improvement on an electricity-conducting roller structure as claimed in claim 2, wherein the fixing hole of the hub is a screw hole.

4. The improvement on an electricity-conducting roller structure as claimed in claim 2, wherein the fixing piece is a screw.

5. The improvement on an electricity-conducting roller structure as claimed in claim 1, wherein the pivotal portion of the fixed supporting member has a curbing protrusion on an outer side thereof for the swinging support member to come into contact with.

6. The improvement on an electricity-conducting roller structure as claimed in claim 1, wherein the hub is made of metallic materials.

7. The improvement on an electricity-conducting roller structure as claimed in claim 1, wherein the fixed supporting member is made of metallic materials.

8. The improvement on an electricity-conducting roller structure as claimed in claim 1, wherein the swinging support member is made of metallic materials.

9. The improvement on an electricity-conducting roller structure as claimed in claim 1, wherein the electricity-conducting roller is made of a plastic material mixed with metallic pellets.

10. The improvement on an electricity-conducting roller structure as claimed in claim 1, wherein the elastic element is a torsion spring.

11. The improvement on an electricity-conducting roller structure as claimed in claim 1, wherein the hub has a wheel fitted thereon.

12. The improvement on an electricity-conducting roller structure as claimed in claim 1, wherein the vehicle is a wheelchair.

13. The improvement on an electricity-conducting roller structure as claimed in claim 1, wherein the vehicle is a hospital bed.

* * * * *